F. F. KEELER, Sr.
COMBINED SHOCK ABSORBER AND SPRING SUPPORT.
APPLICATION FILED DEC. 16, 1921.
1,419,268. Patented June 13, 1922.
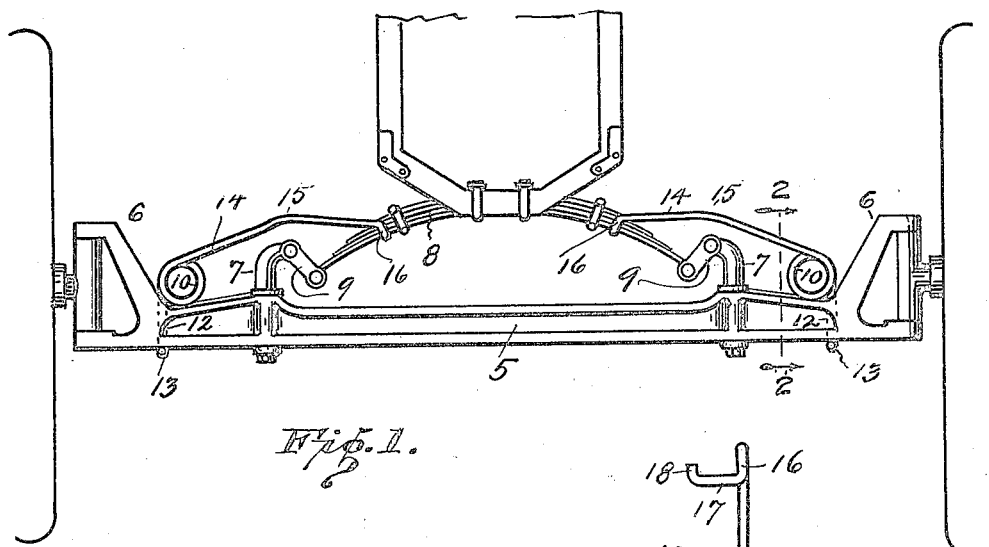
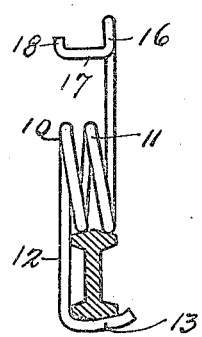
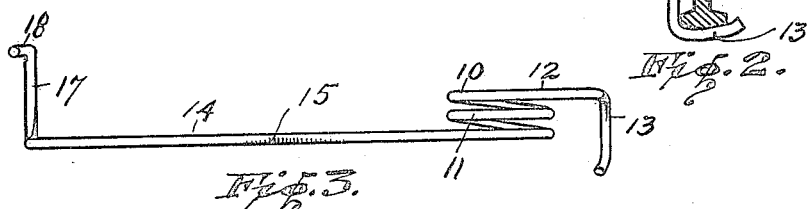
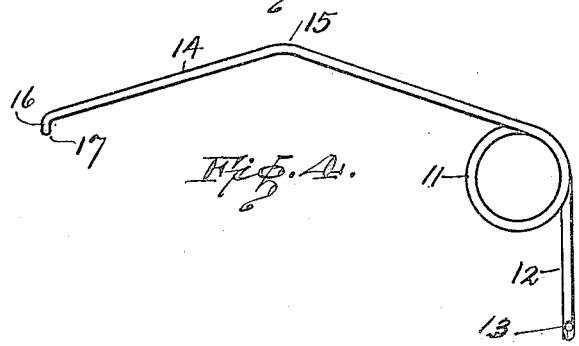
Inventor,
Frank F. Keeler, Sr.
By Joseph A. Minturn,
Attorney.

UNITED STATES PATENT OFFICE.

FRANK F. KEELER, SR., OF INDIANAPOLIS, INDIANA, ASSIGNOR OF ONE-HALF TO THADDEUS R. BAKER, OF INDIANAPOLIS, INDIANA.

COMBINED SHOCK ABSORBER AND SPRING SUPPORT.

1,419,268.

Specification of Letters Patent. Patented June 13, 1922.

Application filed December 16, 1921. Serial No. 522,884.

*To all whom it may concern:*

Be it known that I, FRANK F. KEELER, Senior, a citizen of the United States, residing at Indianapolis, in the county of Marion and State of Indiana, have invented new and useful Improvements in Combined Shock Absorbers and Spring Supports, of which the following is a specification.

The object of this invention is to extend the length of the front spring of an automobile to produce that slow, easy action in its deflection so much desired, by making the front spring a perfect balance in its relation to the rear spring.

The object also is to provide an auxiliary to a weak front spring enabling the latter to carry the load and stand the shock of rough roads with the greatest degree of flexibility, durability, and tensile strength, and eliminating that sudden jar or "buck" and quick re-bound that otherwise obtains in many of the popular cars. In many of the present cars the front spring, made sufficiently heavy to bear the weight of the front end of the machine, is short in length on account of limited space for its assembly and it is consequently stiff and unpleasant to ride on, and my object is to apply a more sensitive spring, working in conjunction with said original spring, to receive the quick and destructive bounds and re-bounds that are harmful without it, and to provide such auxiliary springs, as attachments, that may be quickly and easily applied by an unskilled person to the cars already built and in common use, and to provide such attachments that, beside preventing spring breakage, will prolong the life of the tire, save time and gasoline by making it unnecessary to slow down for rough places in the roadway and which will reduce wear and breakage of hangers and other spring supporting parts.

I accomplish the above and other objects which will hereinafter appear, by the mechanism illustrated in the accompanying drawing, in which—

Fig. 1, is a view in front elevation of the front axle and spring suspension of an automobile with my auxiliary spring attachment applied in working position. Fig. 2, is a vertical section on the line 2—2 of Fig. 1. Fig. 3, is a top plan view of my attachment shown in Fig. 2, and Fig. 4 is a side elevation of the device shown in Fig. 3.

Referring to Fig. 1 the front axle 5 has the end knuckles 6 to which the front wheel stubs are hinged, and it has the spring perches 7 to which the front leaf-spring 8 is connected by shackles 9, all in the usual manner.

My attachment comprises an auxiliary spring, one at each end of the spring 8, and differing from each other and in their assembly, only in that they are rights and lefts, and with this difference in mind the description of the attachment for one end of the spring 8 will suffice for both.

This attachment is here shown as formed out of bar spring steel round in cross section which is bent to form two coils 10 and 11 which are spread sufficiently to receive the high line of the longitudinal ridge usually formed on the top of axle 5, between them, in the manner clearly shown in Fig. 2 when the attachment is in operative position. The free end of coil 10 is formed into a straight arm 12 which extends to the bottom of the axle 5 when the spring coils 10 and 11 are resting upon the top of the axle close to the knuckle 6. The end of arm 12 is bent laterally to form a member 13 that crosses under and contacts the bottom of axle 5, and is bent upwardly at its extremity sufficiently to keep the member 13 from accidental displacement. The free end of coil 11 is extended to form an arm 14 which passes over the perch 7 to approximately the middle of the distance between the center of spring 8 and its end where attached to link 9 and this arm 14 is preferably arched at 15 to allow for vibrations of the arm above perch 7 without contacting the latter. The end of arm 14 is bent down to form a member 16 that contacts the front of spring 8 and the rod is bent laterally at right angles to form a member 17 which contacts the underside of spring 8 and terminates with an upward hook 18 between which and the member 16 the spring 8 is retained. The relative positions of the arms 12 and 14 when the device is off of an automobile will cause the coils and arm 14 to be flexed in introducing the member 17 into operative position under the spring 8.

In assembling my attachment the end 13 is slipped under the axle 5 from the rear and the coils 10 and 11 are pressed into position on the top of the axle, as shown in Fig. 2, and then the arm 14 is depressed sufficiently to enable the member 17 to be brought into place under spring 8, and when one of these auxiliary springs is thus applied to each end of the spring 8 the substantial result is to increase the length of spring 8 to an extent equal to the distance from spring 8 of the arms 12, and by reason of the greater sensitiveness of the auxiliary springs they will absorb the short shocks, and then will materially assist the leaf-spring 8 in supporting heavy loads.

Having thus fully described the best embodiment of my invention now known to me and expressly reserving all of my rights to changes in the form and application of my device not inconsistent with the appended claims, what I claim as new and wish to secure by Letters Patent, is—

1. In a motor car, the combination, with a leaf-spring and an axle parallel with the spring, of an auxiliary spring for each end of the leaf-spring, each comprising a plurality of spring coils resting upon the axle, a depending arm from the coils having an end bent under and bearing against the axle, and having another arm extending inwardly of the car and bearing against the underside of the leaf-spring.

2. An attachment for motor cars having an axle and a leaf-spring, comprising a spring having a plurality of coils to bear upon the top of the car axle, a depending arm for said coils, means for securing the arm to the underside of the axle, a second arm from the axle extending inwardly of the car, and means for securing the inner end of the arm to the leaf-spring of the car.

3. A spring attachment for motor cars formed from a spring bar bent into a pair of coils, the end from one coil extending in the form of an arm below the axle and bent to form a hook-member engaging the underside of the axle, and the end from the other coil extending approximately at right angles to the first arm and terminating with a hook-formation to engage the underside of a car spring.

4. An auxiliary spring attachment for motor cars having an axle and a spring, comprising a spring bar having a hooked end to engage under the axle of the car, a plurality of coils to rest upon the axle, and an arm extending inwardly of the car from the coils and having a hooked end to bear against the underside of the car spring.

Signed at Indianapolis, Indiana, this the 12th day of December, 1921.

FRANK F. KEELER, Sr.